United States Patent Office 3,116,269
Patented Dec. 31, 1963

3,116,269
COPOLYMERS OF A HYDROCARBON BUTADIENE AND A PARTIALLY FLUORINATED BUTADIENE
Francis J. Honn, Westfield, N.J., assignor to Minnesota Mining and Manufacturing Company, St. Paul, Minn., a corporation of Delaware
No Drawing. Filed Oct. 24, 1958, Ser. No. 769,294
4 Claims. (Cl. 260—82.1)

This invention relates to halogen-containing polymers. In one aspect, the invention relates to fluorine-containing copolymers. More particularly in this aspect, the invention relates to fluorine-containing elastomeric copolymers and the method for their manufacture.

This application is a continuation-in-part of my prior and copending application Serial No. 388,755, filed October 28, 1953, now abandoned, and my prior and copending application Serial No. 549,878, filed November 29, 1955, now abandoned.

Fluorine-containing copolymers have been found to possess many useful applications by virtue of their chemical inertness, high physical strength and solvent-resistance. Because of their properties, such fluorine-containing copolymers can be fabricated into a wide variety of useful articles having improved chemical and physical stability. In this respect, it is also desirable, in many cases, for these fluorine-containing copolymers to possess elastomeric properties so that a high degree of flexibility, elasticity and extensibility is obtained, and which can be easily vulcanized and processed.

It is, therefore, an object of this invention to provide new and useful fluorine-containing polymers having desirable chemical and physical characteristics.

It is also an object of this invention to provide new and useful copolymers which are elastomeric and which have low solvent swell.

Another object of this invention is to provide new and useful fluorine-containing elastomeric copolymers, having the aforementioned characteristics, and which can be easily fabricated into a wide variety of useful articles of improved chemical and physical stability.

Still another object of the invention is to provide a method for the preparation of the aforementioned elastomeric fluorine-containing copolymers.

Various other objects and advantages inherent in the invention will become apparent to those skilled in the art from the accompanying description and disclosure.

The copolymers of the present invention are copolymers of a hydrocarbon butadiene and a partially fluorinated butadiene having from 2 to 5 fluorine atoms per molecule. Examples of these partially fluorinated butadienes which can be copolymerized with a hydrocarbon butadiene are 1,1-difluoro-2-methyl butadiene, 1,1,2,4,4-pentanfluorobutadiene, 1,1,3-trifluorobutadiene, 1,1-difluoro-3-methyl butadiene, 1,1,2-trifluorobutadiene, 1,1-difluoro-2-methyl butadiene. The partially fluorinated butadienes are partially substituted 1,3-butadienes, i.e., the remaining atoms other than fluorine being carbon and hydrogen. Preferably, one of the terminal carbon atoms in the four carbon butadiene chain contains only fluorine substituents, having the structure $CF_2=$. The hydrocarbon butadiene which can be polymeirzed with the above-mentioned partially fluorinated butadienes contains only carbon and hydrogen and includes 1,3-butadienes such as isoprene, butadiene, dimethylbutadiene, etc. These hydrocarbon butadienes may contain a total of between 4 and about 8 carbon atoms, preferably between 4 and 6 carbon atoms.

In general, as more fully described hereinafter, these copolymers are prepared by copolymerizing the hydrocarbon butadiene and the partially fluorinated butadiene in the presence of a copolymerization catalyst at temperatures between about 0° C. and about 90° C. and preferably at a temperature between 20° C., and about 60° C. The copolymers thus obtained have been found to be unexpectedly valuable macromolecules which are adaptable to a number of commercial uses and which have physical characteristics comparable to natural rubber gum stocks and yet have excellent solvent swell characteristics, comparable to fluorine-containing rubbers. In particular, they possess low temperature flexibility, elasticity and resiliency, and can easily be vulcanized and processed. These copolymers are chemically and thermally stable, resistant to oil and hydrocarbon fuels, selectively soluble in various organic solvents and can be molded by conventional techniques to yield a wide variety of useful articles. They are also useful as durable, flexible, protective coatings on surfaces which are subjected to environmental conditions in which they may come into contact with various corrosive substances such as oils, fuels and strong chemical reagents.

The most useful elastomeric copolymers produced in accordance with this invention contain between about 5 and about 95 mole percent of the hydrocarbon butadiene. Copolymers containing between about 10 and about 75 mole percent of the hydrocarbon butadiene are preferred because of their outstanding properties. Those copolymers containing between about 13 and about 25 mole percent of the hydrocarbon butadiene display exceptionally good solvent-swell characteristics, good chemical resistance, and yet are rubbery in nature. It is particularly unexpected to find that the copolymers containing between about 13 and about 25 mole percent of the hydrocarbon butadiene are good rubbers having less than the 100 percent volume swell which is specified for many applications. Depending on the copolymer desired, monomer ratios of hydrocarbon butadiene to partially fluorinated butadiene in the feed can range from about 12/88 to about 95/5, preferably from about 12/88 to about 75/25.

The elastomeric copolymers of this invention are preferably prepared by employing a free radical forming polymerization promoter. For example, a water soluble peroxy type catalyst may be used in a water-emulsion type recipe, and organic peroxides may be employed as promoters in a bulk-type polymerization system. The water-emulsion type recipe system is preferred. The peroxy compound present in these water-emulsion or bulk-type recipes functions as an oxidant. This oxidant is preferably an inorganic persulfate, such as potassium persulfate, sodium persulfate or ammonium persulfate. Optionally, a reductant such as potassium bisulfite, sodium bisulfite, potassium metabisulfite and sodium metabisulfite, may be used in the water-emulsion type recipe. The promoter, e.g., peroxide, comprises between about 0.1 and about 5 parts by weight per 100 parts of total monomers present. When used, the reductant, for example, sodium metabisulfite, comprises between about 0.05 and about 5 parts by weight per 100 parts of total monomers present, preferably between about 0.1 and about 2 parts by weight per 100 parts of total monomers present. It has been found that the presence of such materials as borax along with the oxidant and the reductant, if any, is beneficial in these water-emulsion type recipes in aiding in the maintenance of optimum pH conditions.

The emulsifying agent, employed in the above-mentioned water-emulsion type receipe, is in the form of an aliphatic acid metal salt having from 14 to 20 carbon atoms per molecule. A typical example of these emulsifying agent is potassium stearate (KORR soap). Halogen-substituted carboxylic acids which are at best half fluorinated and which contain between about 4 and about 20 carbon atoms per molecule may also be used as emulsifying agents.

The emulsion polymerization is preferably conducted under alkaline conditions. It is desirable in these emulsion polymerization systems that the pH be maintained within the limits between about 7 and 11, in order to prevent gelling of the emulsifying agents, a condition which often causes slow-down or stoppage of the polymerization reaction. In this respect, it should be noted that it is sometimes necessary to maintain the pH of the system between the aforementioned pH limits by the addition of suitable buffer agents. Typical examples are sodium borate and disodium phosphate.

The copolymerizations described herein to produce the copolymers of the present invention are carried out under autogenous conditions of pressure. In general, this pressure does not rise above approximately 500 pounds per square inch.

As previously indicated, the elastomeric copolymers of the present invention are particularly suitable and useful for the fabrication of a wide variety of rubber-like materials having highly desirable physical and chemical properties. In this respect, the copolymers of the present invention possess important utility in the manufacture of protective articles of clothing such as boots, suits, gloves and in the fabrication of resilient gaskets, seals, pump and valve-diaphragms, films and other commercial applications.

Another important use of the copolymers of the present invention is in the form of durable, flexible coatings on fabric surfaces. For this purpose, the copolymers of this invention may be dissolved in various commercial solvents. Particularly useful solvents comprise the aliphatic and aromatic esters, ketones and halogenated hydrocarbons. Typical examples of these solvents are diisobutyl ketone, methyl ethyl ketone, methyl isobutyl ketone, ethyl acetate, and 1,1,2-trifluorotrichloroethane. In this respect, it is often desirable to regulate the molecular weight of the copolymers of this invention in order to obtain greater solubility in organic solvents. This is of importance in order to vary the softness of the copolymers for easier processibility in subsequent molding operations. It is found that the addition of various polymerization modifiers appreciably reduces the molecular weight of the copolymers and increases their solubility and ease of processibility without affecting, unduly, the overall yield. Suitable polymerization modifiers include chloroform ($CHCl_3$), Freon-113 ($CF_2ClCFCl_2$), carbon-tetrachloride ($CCl_4$), trichloroacetyl chloride ($CCl_3COCl$)

bromotrichloroethane ($CBrCl_3$), dodecyl mercaptan ($C_{12}H_{25}SH$)

and mixed tertiary mercaptans. These modifiers are preferably added in amounts between about 0.01 and about 10 parts by weight per 100 parts of total monomers charged to the polymerization reaction. Dodecyl mercaptan is preferred.

The following examples are offered for a better understanding of the present invention and are not to be construed as limiting its scope.

EXAMPLE I

This example illustrates the copolymerization of 1,3-butadiene and 1,1,2-trifluorobutadiene to produce an elastomeric copolymer.

A heavy-walled glass polymerization tube was flushed with nitrogen and then charged with 1 ml. of a solution containing 0.4 gram of sodium metabisulfite and 0.5 gram of borax in 20 ml. of water. The contents of the tube were then frozen and the tube was next charged with 5 ml. of a soap solution comprising 5 grams of potassium stearate (KORR soap) and 0.2 gram of dodecyl mercaptan dissolved in 100 cc. of water. The pH of the soap solution was first adjusted with a 5% solution of potassium hydroxide to 10. The contents of the tube were next refrozen in a Dry Ice-acetone bath and the tube was then charged with 4 ml. of an oxidant solution comprising 1.0 gram of potassium persulfate dissolved in 80 ml. of water. This tube was next connected to a vacuum-transfer system and evacuated at liquid nitrogen temperature. To the frozen contents of the tube were added, by distillation, 1.66 grams of 1,3-butadiene and 3.34 grams of 1,1,2-trifluorobutadiene to make up a total monomer charge containing 50 mole percent of each monomer.

The 1,1,2-trifluorobutadiene monomer was obtained by adding dibromofluoromethane to 1-fluoropropene to produce the adduct $CF_2BrCHFCHBrCH_3$, which, upon dehydrobromination, yielded $CF_2=CF-CH=CH_2$, B.P. 4.8° C.–8.0° C. 1-fluoropropene was prepared by the following series of reactions:

(1) $$CHCl=CHCH_3 + Br_2 \xrightarrow{R.T.} CHClBrCHBrCH_3$$

(2) 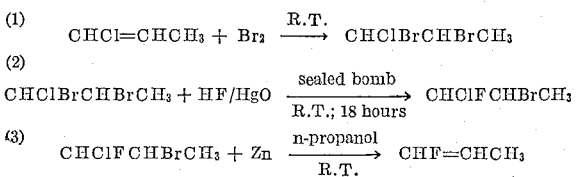

(3) $$CHClFCHBrCH_3 + Zn \xrightarrow[R.T.]{\text{n-propanol}} CHF=CHCH_3$$

The polymerization tube was then sealed and rotated end-over-end in a temperature-regulated water-bath at 50° C. for a period of 23 hours. The polymer latex thus obtained was coagulated by freezing at liquid nitrogen temperature. The coagulated product was then collected, washed with hot water and dried to constant weight in vacuo at 35° C. A snappy, rubbery product was obtained, which was found, upon analysis, to comprise approximately 43 mole percent 1,3-butadiene and the remaining major constituent 1,1,2-trifluorobutadiene being present in an amount of approximately 57 mole percent. The copolymer was obtained in an amount corresponding to an 86% conversion. The rubbery product had a percent volume swell (ASTM D471–55–T) of about 175% and a Gehman $T_{10}$ value (ASTM D1053–54–T) of about −40° C.

EXAMPLE II

This example illustrates the copolymerization of 1,3-butadiene and 1,1,3-trifluorobutadiene to produce an elastomeric copolymer.

Employing the procedure set forth in Example I and the same catalyst solution, the polymerization tube was charged with 1.66 grams of 1,3-butadiene and 3.34 grams of 1,1,3-trifluorobutadiene to make up a total monomer charge containing 50 mole percent of each monomer.

The 1,1,3-trifluorobutadiene monomer was obtained by adding dibromodifluoromethane to 2-fluoropropene to produce the adduct, $CF_2BrCH_2CFBrCH_3$, which was then dehydrobrominated at about 150° C. using tri-n-butyl amine to yield $CF_2=CH-CF=CH_2$, B.P. 17.5° C.–19.4° C. 2-fluoropropene was prepared by the following series of reactions:

(1) $$CH_2ClCHClCH_3 + KOH \longrightarrow CH_2=CClCH_3 + CHCl=CHCH_3$$

(2) $$CH_2=CClCH_3 + HF \longrightarrow CH_3CFClCH_3$$

(3) 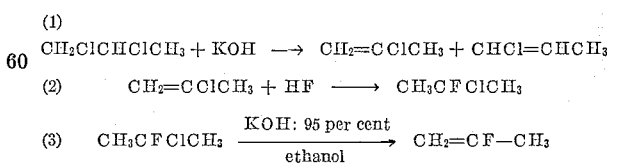

The polymerization reaction was carried out under autogenous conditions of pressure at a temperature of approximately 50° C. for a period of 23 hours. The resultant elastomeric product was worked-up in accordance with the same procedure as set forth in Example I. An elastomeric copolymer was obtained and found to comprise approximately 77 mole percent 1,3-butadiene and the remaining major constituent 1,1,3-trifluorobutadiene being present in an amount of approximately 23 mole percent. The above copolymer was obtained in an amount corresponding to a 21% conversion.

EXAMPLE III

This example illustrates the copolymerization of butadiene and 1,1,2,4-tetrafluorobutadiene to produce an elastomeric copolymer.

Employing the procedure set forth in Examples I and II above, and the same catalyst solution, the polymerization tube is charged with 1.5 grams of butadiene and 3.5 grams of 1,1,2,4-tetrafluorobutadiene monomers to make up a total monomer charge containing 50 mole percent of each monomer.

The 1,1,2,4-tetrafluorobutadiene is obtained as follows:

A solution of 60 grams 85% KOH pellets in 50 ml. of water is added to a 500 ml. 3-neck flask equipped with a stirrer, and addition funnel and 6-inch column with a fractionating head. The solution is heated and 80 grams (0.25 mole) of $CF_2BrCFClCH_2CHFBr$ are added slowly from the addition funnel. The distillate is collected at 80°–90° C. (33 grams) B.P. 95°–98° C. and 13 grams of unreacted material. A center cut of the olefin has the following properties: B.P. 97.3° C.; $n_D^{25}$ 1.3961; $d_4^{25}$ 1.781; MRD, calc. 32.44, found 32.58; Ag, equivl. 1207, found 121.3. It is found from the above data and infrared absorption spectra that $CF_2BrCFClCH=CHF$ is obtained.

Two additional runs are made in a similar manner using 323 grams (1 mole) and 290 grams (0.9 mole) of $CF_2BrCFClCH_2CHFBr$, respectively, from which 65 grams (30.5% conversion) and 63 grams (30% conversion) of $CF_2BrCFClCH=CHF$ are obtained.

The olefin, $CF_2BrCFClCH=CHF$, prepared above, is dehalogenated to give the diene, $CF_2=CF—CH=CHF$ according to the following procedure: To a hot slurry of Zn dust (75 grams), $ZnCl_2$ (2 grams) and propanol-1 (80 ml.) contained in a 200 ml. 3-neck flask equipped with a stirrer, and addition funnel and reflux condenser leading to a cold trap, are added dropwise $CF_2BrCFClCH=CHF$, 160 grams (0.66 mole). The reaction proceeds smoothly to give 75 grams of crude product. This is fractionated giving 67 grams diene B.P. 16° C.–18° C. (80%) with the following constants: B.P. 16.5° C.; $n_D^0$, 1.3427; $d_4^0$, 1.342; $MR_D$ calc. 19.74, found 19.84. Molecular weight (by vapor density) calc. 126, found 122.8. The infrared spectrum of this diene shows absorption bands at 5.62, 5.80 and 6.00 microns for the unsaturated system. This diene polymerizes readily at room temperatures to give a white, spongy, rubber-like material, viz., 1,1,2,4-tetrafluorobutadiene-1,3.

The polymerization reaction is carried out under autogenous conditions of pressure at a temperature of 50° C. for a period of approximately 24 hours. The resultant elastomeric product is worked-up in accordance with the same procedure as set forth in Examples I and II. An elastomeric copolymer is obtained comprising butadiene and 1,1,2,4-tetrafluorobutadiene in a good yield.

EXAMPLE IV

This example illustrates the copolymerizations of butadiene and 1,1,2,4,4-pentafluorobutadiene to produce an elastomeric copolymer.

Employing the same procedure as set forth in Examples I, II and III above, and the same catalyst solution, the tube was charged with 1.36 grams of butadiene and 3.64 grams of 1,1,2,4,4-pentafluorobutadiene monomer charge containing 50 mole percent of each monomer. The 1,1,2,4,4-pentafluorobutadiene was obtained as follows:

1-chloro-1,2-dibromo-1,2,2-trifluoroethane, $$CF_2BrCFClBr$$

was added to vinylidene fluoride to yield, $$CF_2BrCFClCH_2CF_2Br$$

which was then dehydrobrominated using potassium hydroxide, followed by debromochlorination using Zn to yield, $CF_2=CF—CH=CF_2$, B.P. 15.0–15.5° C. The co- polymerization reaction was carried out under autogenous conditions of pressure at a temperature of about 50° C. for a period of about 26 hours. The resultant elastomeric product was worked-up in accordance with the same procedure as set forth in Examples I, II and III above. An elastomeric copolymer was obtained and found to comprise approximately 50 mole percent of 1,1,2,4,4-pentafluoro-butadiene as the remaining major constituent. The above copolymer was obtained in an amount corresponding to a 60% conversion.

EXAMPLE V

This example illustrates the copolymerization of 1,1-difluoro-2-methyl butadiene-1,3 and isoprene to produce an elastomeric copolymer.

A heavy-walled glass polymerization tube was charged with 9.0 ml. of soap solution (900 gms. water, 25 gms. potassium stearate, 15 gms. dodecyl mercaptan) and 1.0 ml. of catalyst solution (100 gms. water, 1.5 gms. $K_2S_2O_8$). The tube was evacuated at liquid nitrogen temperature and the monomers were distilled from a measuring graduate into the tube. 1.97 grams of isoprene and 3.02 grams of 1,1-difluoro-2-methyl butadiene were thus added to make a total monomer charge containing 50 mole percent of each monomer (pH–10.2).

The 1,1-difluoro-2-methyl-butadiene may be prepared by adding a quantity of the adduct from the reaction of $CF_2BR_2$ with butene-2 to a flask containing tributylamine and heating with refluxing to yield $CF_2=C(CF_3)—CH=CH_2$ B.P. 39.0–39.5° C.

The polymerization tube was then sealed and tumbled for 24 hours in a 50° C. water bath. The polymer latex thus obtained was coagulated by freezing at liquid nitrogen temperature. The coagulated product was then collected, washed with hot water and dried to constant weight in vacuo at 35° C. A rubbery product was obtained which, upon analysis, was found to comprise 50 mole percent of each monomer. The copolymer was obtained in an amount corresponding to a conversion of 86%.

EXAMPLE VI

This example illustrates the copolymerization of 1,1-difluoro-2-methyl-butadiene-1,3-and butadiene-1,3 to produce an elastomeric copolymer.

Employing the procedure set forth in Example V and the same catalyst and soap solution, the polymerization tube was charged with 1.70 grams of butadiene and 3.29 gms. of 1,1-difluoro-2-methyl butadiene-1,3 to make a total monomer charge containing 50 mole percent of each monomer (pH–10.2).

Preparation of 1,1-difluoro-2-methyl butadiene is indicated in Example V.

After the sealed tube was tumbled in a 50° C. water bath for a period of 24 hours, the latex was coagulated by freezing, washed with hot water and dried in vacuo at 35° C. A soft rubbery product was produced in 83% conversion. This copolymer product contained 48 mole percent of 1,1-difluoro-2-methyl-butadiene and 52 mole percent of butadiene.

EXAMPLE VII

This example illustrates the copolymerization of 1,1-difluoro-3-methyl-1,3-butadiene and 1,3-butadiene to produce an elastomeric copolymer.

Using the procedure set forth in Example I, the polymerization tube was charged with the following recipe:

| | Parts by wt. |
|---|---|
| $K_2S_2O_8$ | 1.0 |
| $Na_2S_2O_5$ | 0.5 |
| Borax | 0.5 |
| $C_7F_{15}COONH_4$ | 6.0 |
| Tertiary dodecyl mercaptan | 0.1 |
| Monomer (50/50 mole ratio) | 100 |
| Water | 200 |

1,1-difluoro-3-methyl-1,3-butadiene may be prepared by reacting difluorodibromoethane and isobutylene in the presence of benzoyl peroxide at a temperature of 80° C. The product, $CF_2BrCH_2CBr(CH_3)_2$, B.P. 83–84.2° C./81 mm., is then reacted at 180–190° C. with tributylamine and distilled to produce 1,1-difluoro-3-methylbutadiene, B.P. 35.5° C.

After 21 hours at 50° C. in a constant temperature bath, the resulting latex was coagulated, washed with hot water, and dried in vacuo at 35° C., yielding a rubbery product.

EXAMPLE VIII

Tables 1 and 2 illustrate the copolymerization of butadiene-1,3 and 1,1,2-trifluorobutadiene-1,3 to produce an elastomeric copolymer with outstanding Gehman stiffness values and swell resistance.

coating composition has been applied to the surface is permitted to evaporate. This may also be accomplished in the presence of elevated temperatures. In many applications, it is desirable to include in the elastomeric coating composition various vulcanizing agents, in which case, supplementary heat treatment of the coating is required, either during the solvent removal step or thereafter. After the solvent has been completely evaporated, and after the vulcanization step, if included, has been completed, the coated surface is now ready for use. In this resepct, it should also be noted that the copolymeric coating composition may be applied to the surface either as a single coating or, if so desired, the protective coating may be built-up by the application of several layers, each layer being permitted to harden by solvent evaporation before the next layer is applied. Furthermore, if so desired, the protective coatings, or the elastomeric copoly- Table 1

| Ex. | Mole Ratio, BD/TFBD | Grams Monomer, BD/TFBD | Recipe, cc. | Time, hr. | Temp., °C. | Conversion, percent | Latex Stability | Coagulation | Wash | Dry, °C. | Nature of Copolymer | Copolymer Mole Ratio, BD/TFBD |
|---|---|---|---|---|---|---|---|---|---|---|---|---|
| VIII | 10/90 | 0.3/5.7 | ¹ 12 | 20 | 45 | 100 | excellent | freeze | Hot H₂O and MeOH. | 50 | Snappy rubber. | 24/76 rubber. |
| IX | 17/83 | 2.33/22.7 | ² 28 | 20 | 35 | 90 | good | do | do | 60 | do | 20/80 |
| X | 15/85 | 2.08/22.98 | ² 28 | 20 | 35 | 90 | do | do | do | 60 | do | 18/82 |
| XI | 14/86 | 1.87/23.1 | ¹ 28 | 17 | 55 | 97.6 | do | do | do | 50 | do | 14/86 |
| XII | 12/88 | 1.59/23.4 | ¹ 28 | 20 | 30 | 97.6 | do | do | do | 50 | Tough rubber | 14/86 |
| XIII | 11/89 | 1.45/23.5 | ¹ 28 | 20 | 30 | 98.4 | do | do | do | 50 | Very tough rubber. | 12/88 |
| XIV | 75/25 | 3.6/2.4 | ¹ 12 | 20 | 45 | 50 | excellent | do | do | 50 | Rubber | 58.5/41.5 |

¹ Recipe:

```
                                                                    parts by wt.
K₂S₂O₈ --------------------------------------------------------------- 1.5
C₇F₁₅COOH ------------------------------------------------------------ 5.45
KOH ------------------------------------------------------------------ .75
K₂HPO₄ --------------------------------------------------------------- 1.5
H₂O ------------------------------------------------------------------ 100
```
² Recipe (¹) above with catalyst cut in half.

Table 2

GEHMAN STIFFNESS,¹ ° C

| Ex. | Copolymer Mole Ratio, BD/TFBD | $T_2$ | $T_5$ | $T_{10}$ | $T_{100}$ | Percent volume swell ² |
|---|---|---|---|---|---|---|
| VIII | 24/76 | −37 | −39 | −40 | −40.5 | 57 |
| IX | 20/80 | −37 | −40 | −41 | −46.5 | |
| X | 18/82 | 0 | −35 | −38 | −42 | 60/80 |

¹ ASTM D 1053-54-T.
² ASTM D 471-55-T, "Reference Fuel B".

As previously indicated, the elastomeric copolymers of the present invention possess highly desirable chemical and physical properties which make them useful for the fabrication of a wide variety of rubber-like articles or for application to various surfaces as protective coatings. In such uses, the raw elastomeric copolymer (such as is produced in accordance with the procedures set forth in Examples I through IV above) can be extruded or pressed into sheets at temperatures between about 210° F. and about 400° F. Thereafter, various articles can be molded from preforms cut from sheets or extruded stock, in the form of gaskets, diaphragms, etc. In this respect, it should also be noted that the raw copolymer may also be combined with various vulcanizing agents and fillers, if so desired.

When employed as protective coatings on any of the surfaces previously described, the raw elastomeric copolymer is dissolved in any of the aforementioned solvents and is applied to the desired surfaces, employing such apparatus as a knife-spreader or a doctor-blade or a reverse-roll coater. The solvent, after the elastomeric mer when obtained in the form of sheets may be suitably pigmented. Other uses for the copolymers of the present invention reside in the fabrication of pressure-sensitive tape for electrical insulation purposes or as adhesives for fastening a rubber surface to a metal or another rubber surface.

Since certain changes may be made in carrying out the process of the present invention in producing the elastomeric copolymers without departing from the scope of the invention, it is intended that all matter contained in the above description is to be interpreted as illustrative and not in a limiting sense.

I claim:
1. A copolymer of isoprene and 1,1-difluoro-2-methyl-butadiene having between about 5 and about 95 mol percent of isoprene.
2. A copolymer of butadiene and 1,1-difluoro-2-methyl-butadiene having between about 5 and about 95 mol percent of butadiene.
3. An elastomeric copolymer having exceptional solvent swell characteristics which consists essentially of isoprene and 1,1-difluoro-2-methyl-butadiene having between about 13 and about 25 mol percent of isoprene.
4. An elastomeric copolymer having exceptional solvent swell characteristics which consists essentially of butadiene and 1,1-difluoro-2-methyl-butadiene having between about 13 and about 25 mol percent of butadiene.

References Cited in the file of this patent

UNITED STATES PATENTS

| 2,446,382 | Mochel | Aug. 3, 1948 |
| 2,750,431 | Tarrant et al. | June 12, 1956 |

UNITED STATES PATENT OFFICE
CERTIFICATE OF CORRECTION

Patent No. 3,116,269                           December 31, 1963

Francis J. Honn

It is hereby certified that error appears in the above numbered patent requiring correction and that the said Letters Patent should read as corrected below.

Column 1, line 54, for "petanfluorobutadiene" read -- pentafluorobutadiene --; column 5, line 23, for "1207" read -- 120,7 --; column 5, line 24, in the formula, for "$CR_2$" read $CF_2$ --.

Signed and sealed this 2nd day of June 1964.

(SEAL)
Attest:

ERNEST W. SWIDER
Attesting Officer

EDWARD J. BRENNER
Commissioner of Patents